INVENTORS.
HOEL L. BOWDITCH
EVERETT O. OLSEN
BY
Curtis, Morris & Safford
their ATTORNEYS

# United States Patent Office 3,005,885
Patented Oct. 24, 1961

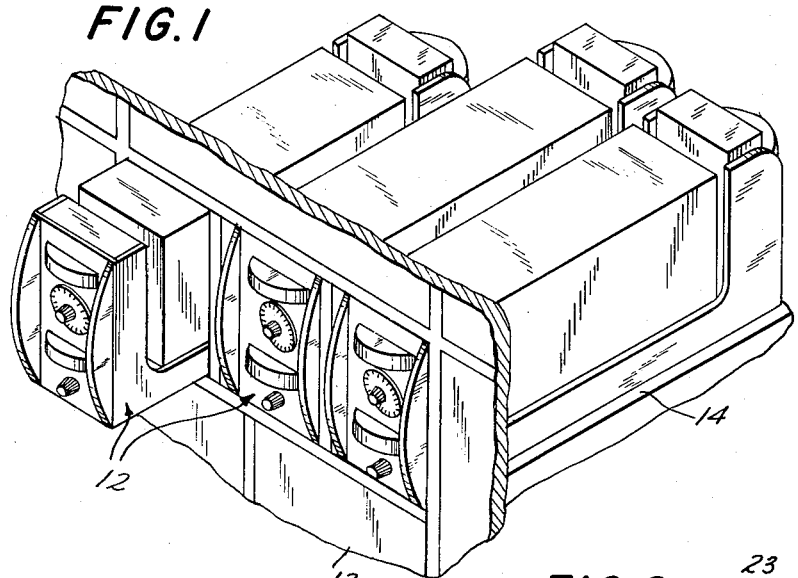
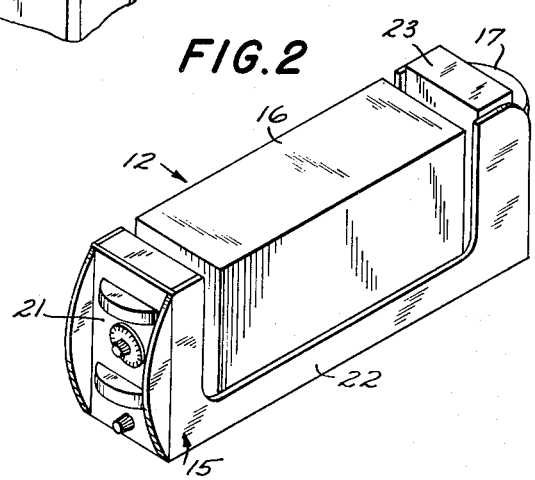
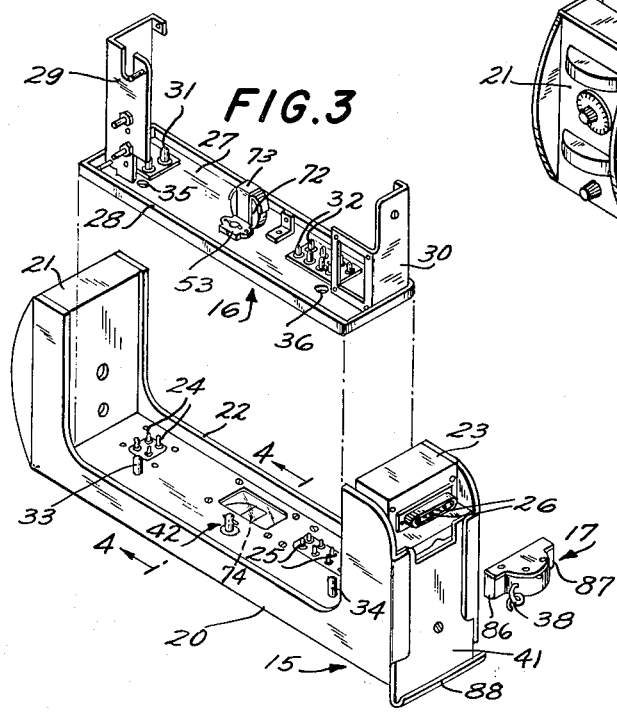
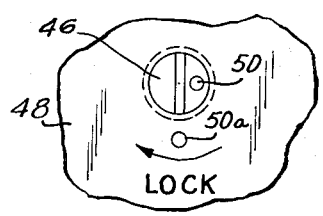
Oct. 24, 1961 H. L. BOWDITCH ET AL 3,005,885
SAFETY SWITCH ARRANGEMENTS
Filed Sept. 12, 1958 3 Sheets-Sheet 1
FIG.1
FIG.2
FIG.3
FIG.10
INVENTORS
HOEL L. BOWDITCH
EVERETT O. OLSEN
BY Curtis, Morris & Safford
their ATTORNEYS Oct. 24, 1961 H. L. BOWDITCH ET AL 3,005,885
SAFETY SWITCH ARRANGEMENTS
Filed Sept. 12, 1958 3 Sheets-Sheet 2
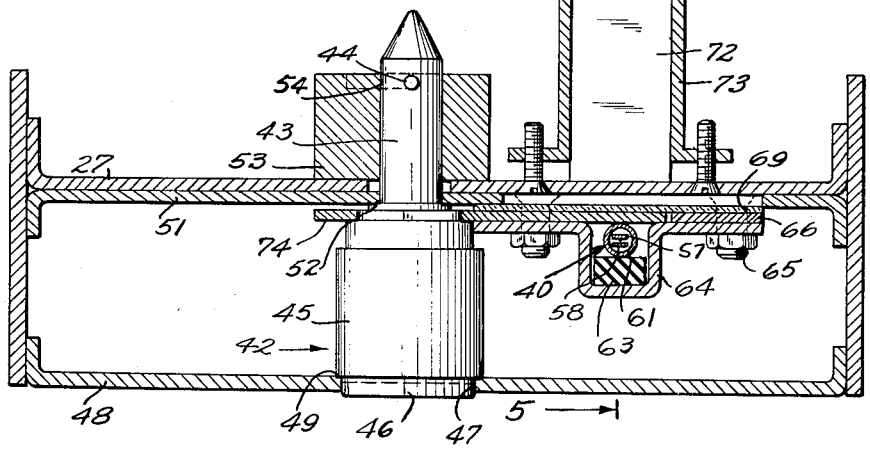
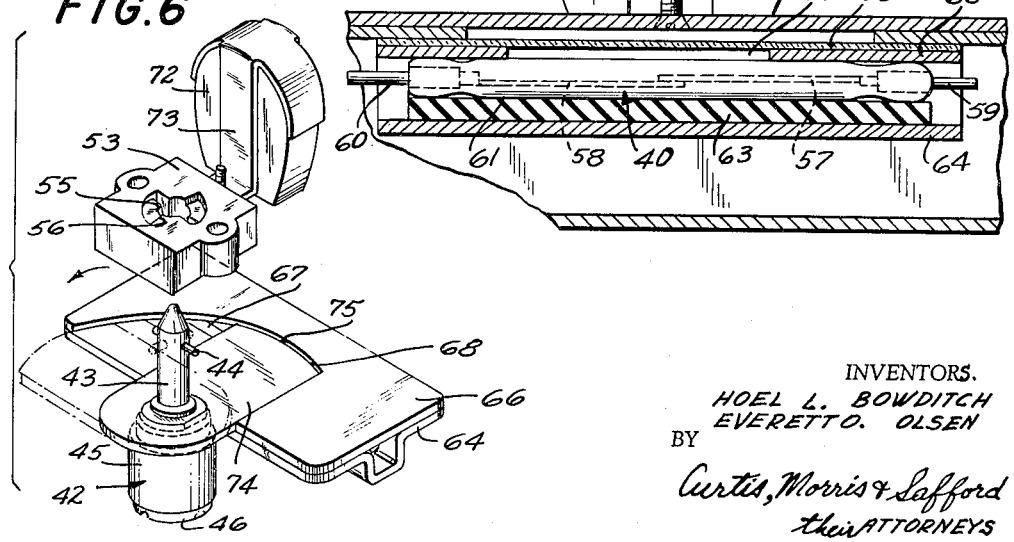
INVENTORS.
HOEL L. BOWDITCH
EVERETT O. OLSEN
BY Curtis, Morris & Safford
their ATTORNEYS Oct. 24, 1961   H. L. BOWDITCH ET AL   3,005,885
SAFETY SWITCH ARRANGEMENTS
Filed Sept. 12, 1958   3 Sheets-Sheet 3

3,005,885
SAFETY SWITCH ARRANGEMENTS
Hoel L. Bowditch, Foxboro, and Everett O. Olsen, Wrentham, Mass., assignors to The Foxboro Company, Foxboro, Mass.
Filed Sept. 12, 1958, Ser. No. 760,792
14 Claims. (Cl. 200—50)

The present invention relates to an electric switching arrangement and more particularly to safety switches for detachable units of an electric system.

In recent years there has been a definite trend toward making electronic equipment in quickly detachable modular units and mounting such units on a panel or in a suitable frame. The different modules may perform similar or different functions and may be connected electrically as well as mechanically by mounting one on the other or on a panel or frame. Thus, when any particular unit or module is defective, it may be easily and quickly removed for repair or replacement.

Each individual module may be slidably mounted in a frame and each module may comprise a plurality of separate detachable component units to facilitate servicing or replacement. The module itself may have a detachable connection to receive electric current from and/or deliver electric currents to a circuit or circuits outside the module and the individual units of each module may have quick detachable connections to mechanically and electrically connect the units to each other.

The present invention is shown applied to an electronic controller removable from a frame as a unit which, in turn, comprises a basic unit including a manual regulator (to produce a manually adjustable signal) and a function generator unit (to generate controlling signals responsive to a change in a condition to be controlled) detachably mounted on the basic unit. Each of the units of the module has a separate internal circuit and the module itself has a detachable electric connection with an external circuit or circuits for receiving and/or supplying electric currents from and to the internal circuits of the separate units. It will be understood, however, that the modules may comprise other instruments such as ratio amplifiers, electronic controllers of other types, voltage regulators, alarm equipment and the like, either individually or as components of a larger system. The individual units of each module, in turn, may comprise an element or plurality of connected elements such as vacuum tubes, transformers, resistors, capacitors or the like with the element of each unit detachably connected both mechanically and electrically. Such electronic equipment may be used for direct or remote control of industrial processes or telemetric indication of a condition or conditions.

One of the objects of the present invention is to provide a safety switch arrangement to insure that each detachable unit of an assembly of electrical units is electrically disconnected before a unit is assembled with or detached from other units;

Another object is to magnetically control the operation of an hermetically sealed saftey switch in the electric circuit of at least one of a plurality of assembled units.

Another object is to provide an interlocking mechanism for mechanically locking and unlocking the detachable units of an assembly of electrical units and controlling the operation of a magnet to close an hermetically sealed safety switch when the units are locked and open the switch when the units are unlocked.

Another object is to provide safety switches in the circuits of electrically connected detachable units which are selectively operable to open and close the entire circuit to the module or the circuit of individual detachable units of the module.

Still another object is to provide safety switches of the type indicated which are of simple and compact construction, adapted for economical manufacture and reliable in operation.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 1 is a perspective view of a portion of a frame mounting a plurality of electronic controllers incorporating the present invention and showing the manner of removing each modular controller by sliding it from the frame;

FIGURE 2 is a perspective view of one of the electronic controllers showing the detachably connected manual regulator, function generator and plug in assembled relationship;

FIGURE 3 is an extended perspective view of the units of the controller in detached relationship;

FIGURE 4 is a transverse sectional view taken on line 4—4 of FIGURE 3 showing the magnetically operated disconnect switch having its contacts biased to open circuit position, the magnet on the other unit for operating the switch and magnetic shunt for controlling the magnet;

FIGURE 5 is an enlarged sectional view of a portion of the assembled units showing the contacts of the disconnect switch operated to close position by the magnet;

FIGURE 6 is a perspective view showing the key for simultaneously locking the units to each other and moving the magnet shunt to inoperative position;

FIGURE 10 is a bottom plan view of the key for operating the lock and magnetic shunt.

Figure 8:
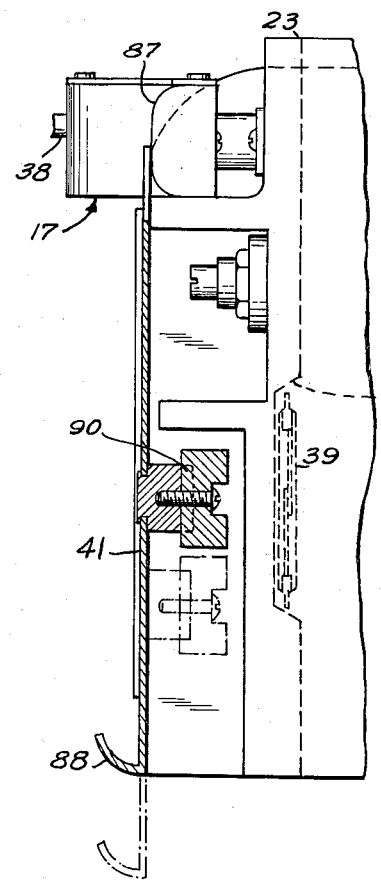
FIGURE 8 is a vertical sectional view through the rearward end of the manual regulator and showing the plate for simultaneously locking the plug to the manual regulator and controlling the operation of a disconnect switch.

In the illustrated embodiment, the invention is shown applied to an electronic controller 12 generally similar to the controller described and claimed in a copending application for Letters Patent of Everett O. Olsen and Francis J. Ricker, Serial No. 701,601 filed December 9, 1957, and entitled Control Apparatus. Such controllers 12 are adapted for use in large industrial processes for maintaining a desired condition in one or more steps of the process. As shown in FIGURE 1, the controllers 12 are of modular unit construction and a plurality of the controllers are shown in a frame 13 to adapt each controller to be easily and quickly removed for repair or replacement. As shown, each controller is mounted to slide outwardly from the frame and the frame has runners 14 for supporting it for sliding movement into and out of the frame. It will be understood, however, that the present invention can be applied to other electrical and electronic units having different elements for performing different functions in the control system of an industrial process.

As shown in FIGURES 1 to 3, each controller 12 comprises three quickly detachable units which will be identified for purposes of description as a manual regulator 15, a function generator 16 and a connector plug 17. As shown in FIGURES 2 and 3, the manual regulator 15 comprises a generally U-shaped frame having a front panel 21 with manual adjustable control dials and knobs, a horizontally extending base section 22 and an upwardly extending connecting block 23 at the rear. The manual regulator unit 15 contains electronic equipment electrically connected to provide at least one circuit for connection to a source of electric current. Projecting upwardly from the top of the base section 22 of the manual regulator unit 15 are two sets of prongs 24 and 25 and projecting outwardly from the block 23 at the rear of the unit is another set of prongs 26 constituting electric connecting terminals.

The function generator 16 also contains electronic elements and equipment connected in a circuit for receiving electric current from manual regulator 15 and producing electric signals responsive to a change in a condition. In FIGURE 3, the casing and electric equipment have been removed to show only the chassis of the unit for the purpose of more clearly illustrating the invention. The chassis of the function generator 16 comprises a bottom plate 27 having an upwardly projecting peripheral flange 28 at its edge and upstanding mounting brackets 29 and 30 adjacent each end. Plate 27 of the function generator 16 is provided with a plurality of spring socket connections 31 and 32 adapted to be engaged by the upwardly projecting prongs 24 and 25 and providing electrical plug-in connections when the function generator is mounted on the manual regulator unit 15. Dowel pins 33 and 34 also project upwardly from the top of base section 22 of manual regulator 15 which cooperate with holes 35 and 36 in the bottom plate 27 of the function generator 16 to facilitate alignment and guide the units during assembly.

Connector plug 17 is provided with the plurality of spring sockets of conventional construction for detachable engagement with the prongs 26 projecting from connecting block 23 of the manual regulator unit 15 to provide electrical plug-in connections. As will be observed by reference to FIGURES 3 and 7, the connector plug 17 has a cable 38 with individual conductors for electrical contact with each of the prongs 26 through cooperating sockets. At least one prong 26 and connected conductors in the plug 17 and manual regulator unit 15 supply electric current to a circuit or circuits in the unit when the plug is mounted thereon; and at least one pair of interengaging prongs of the groups 24, 25 and 31, 32 supply electric current to the function generator 16 when it is mounted on the manual regulator unit 15.

In accordance with the present invention, magnetically operated safety switches 39 and 40 are provided in the main circuit of the controller 12 and branch circuit to function generator 16, respectively, which are controlled by locking elements 41 and 42 for locking the plug 17 and function generator to the manual regulator 15. The arrangement is such that the safety switches 39 and 40 are opened when the locking elements 41 and 42 are moved to unlocking position for mounting units 16 and 17 on or detaching the units from the manual regulator 15; and the safety switches are closed when the locking elements are moved to locking position.

As shown in FIGURES 3 to 6, the locking element 42 comprises a key mounted to rotate in the horizontal base section 22 of the manual control unit 15 and has a stem 43 projecting upwardly from the base section with a bit 44 at its upper end. As shown in detail in FIGURE 4, key 42 has a cylindrical body member 45 with a reduced end 46 fitting in an opening 47 in the bottom wall 48 of the manual regulator unit 15 and providing an annular shoulder 49 overlying the top of the wall. The bottom face of the reduced end 46 of key 42 is slotted as illustrated in FIGURE 10, to adapt it to be turned by a screwdriver and has a dot 50 cooperating with a fixed index dot 50a on the bottom wall 48 for indicating the locking and unlocking positions of the key. The reduced stem 43 of the key projects upwardly through a hole in the top wall 51 of the manual regulator 15 and provides an annular shoulder 52 underlying the top wall. The bit 44 of the key 42 is in the form of a pin projecting through the stem 43 above the top wall 51.

Function generator 16 has a locking plate 53 mounted on the bottom plate 27 of the chassis which is provided with a keyhole 54 of the same size and shape as the stem 43 and bit 44 of the key 42. Thus, when the function generator unit 16 is mounted on the manual regulator unit 15, the key 42 moves through the keyhole 54 until the bit 44 overlies the top of the locking plate. In the illustrated embodiment the top of the locking plate 53 is recessed to receive the bit and provide horizontal locking shoulders 55 and vertical shoulders 56 to limit the turning of the key through an angle of 90° only. Preferably, the locking plate 53 has a spring detent (not shown) for yieldingly holding the bit 44 in locked position.

The safety disconnect switch 40 is mounted on the manual regulator unit 15 adjacent the key 42 as illustrated in FIGURES 4 and 5. Safety switch 40 comprises a pair of spring contacts 57 and 58 mounted on terminals 59 and 60 at opposite ends of a glass envelope 61 which hermetically seal the contacts to render it explosion proof and prevent arcing or accidental closure by a tool. The spring contacts 57 and 58 are normally biased to a spaced open circuit position, as illustrated in FIGURE 4, and at least one of the contacts 58 is of a magnetically permeable material to close the contacts when subjected to a magnetic field. Magnetic safety switch 40 is mounted on a rubber block 63 in a U-shaped bracket 64, which, in turn, is mounted on the underside of the top wall 51 of the manual regulator unit 15 by screws 65. Interposed between the bracket 64 and top wall 51 is a guide plate 66 having an opening 67 with an arcuate edge 68 and a thin overlying plate 69 for a purpose as will presently appear. The top wall 51, bracket 64, guide plate 66 and plate 69 are made of a material which is magnetically impermeable, such as aluminum or a plastic.

Magnetic safety switch 40 is actuated to closed position by a permanent horseshoe type magnet 72 of a suitable material such as Alnico. Magnet 72 is fixedly mounted on the bottom plate 27 of the function generator 16 by a suitable bracket 73 in a position to overlie the switch 40 on manual regulator unit 15 when the two units are assembled one on the other. The operation of magnet 72 to close the switch 40 is controlled by a magnetic shunt 74 on the key 42. Shunt 74 is in the form of a thin bar of magnetically permeable material, such as iron or steel, and having a width to short circuit the magnetic path of its flux from one pole of the magnet to the other. The shunt bar 74 is locked to the key 42 for rotation therewith, see FIGURE 6, and has an arcuate outer edge 75 corresponding to the arcuate edge 68 of the opening 67 in the guide plate 66. As will be observed by reference to FIGURE 6, the magnetic shunt bar 74 extends in a direction at right angles to the bit 44 of the key 42 for rotation from the position shown in full lines between the magnet 72 and switch 40 to a position at right angles thereto as shown in dotted lines to provide an open path for lines of magnetic flux between the magnet and switch. When the shunt 74 is positioned between the magnet 72 and switch 40, the contacts 57 and 58 spring away from each other to open circuit position, but when the shunt 74 is moved to one side, the magnet 72 pulls the contacts 57 and 58 into engaging circuit closing position. As will be further observed by reference to FIGURE 6, the opening 67 in the guide plate 66 and the overlying plate 69 guide the movement of the shunt 74 as it is moved by the key 42 from a circuit opening to a circuit closing position. It will still further be observed that the shunt 74 and bit 44 of the key 42 are so angularly arranged that the magnetic disconnect switch 40 is in open circuit position when the key 42 is in unlocking position and the switch is closed when the key is moved to its locking position.

One feature of the invention is the mounting of the magnet 72 on one of the detachable units 16 and the switch on the other unit 15 so that when unit 16 is detached, the magnet 72 is physically removed from proximity with switch 40 so that the switch can not be accidentally closed when the units are detached. Furthermore, the units can not be detached unless the shunt 74 is in switch opening position, nor can the unit 16 be mounted on the unit 15 until the shunt is in circuit opening position.

Figure 7:
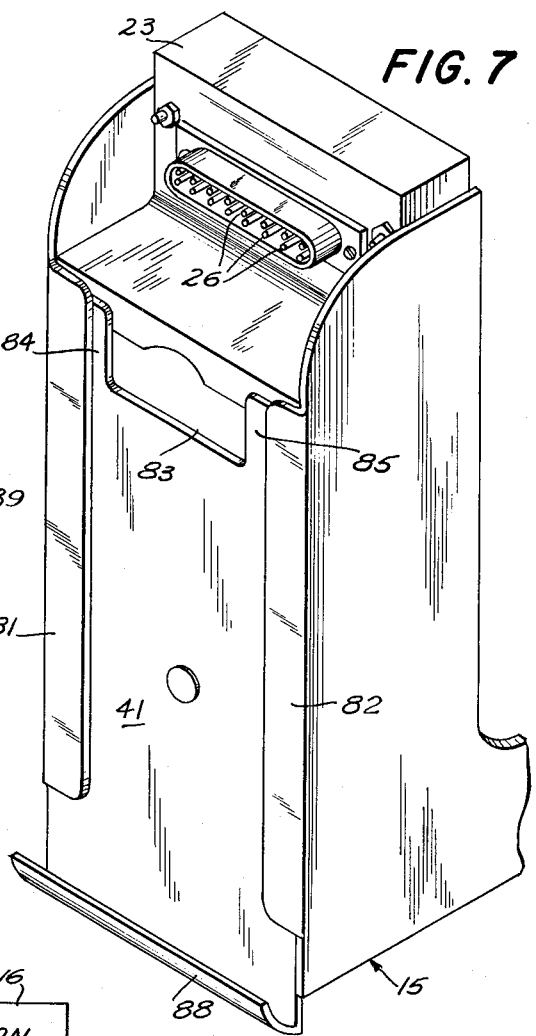
FIGURE 7 is a perspective view of the rearward end of the manual regulator showing the electrical connections to be engaged by a plug and the interlocking plate.

FIGURES 7 and 8 of the drawings illustrate the interlocking means 41 for simultaneously locking the connector plug 17 to the manual regulator unit 15 and closing the safety switch 39; or simultaneously unlocking the plug for detachment from the unit and insuring the opening of the magnetic disconnect switch 39. The interlocking means 41 comprises a plate mounted to slide in guideways 81 and 82 at opposite sides of the connector block 23 and formed by flanges inturned from the side plates of the block. Plate 41 has a central recess 83 at its upper edge to form spaced shoulders 84 and 85 adapted to overlie corresponding shoulders 86 and 87 on the connector plug 17. Plate 41 also has a flange 88 at its lower end to provide a handle for manipulating the slide to locking and unlocking positions.

Magnetic safety switch 39 is of the same construction as the magnetic switch 40 previously described and mounted in a recess 89 in the wall in the connecting block 23 which is composed of a non-magnetic material such as a plastic. Mounted on the inside face of locking plate 41 intermediate its ends is a horseshoe magnet 90 which overlies the switch 39 in its raised locking position to close the switch 39 and is moved to one side of the switch when the locking plate is moved to its unlocking position illustrated in dotted lines in FIGURE 8. Thus, the connector plug 17 can only be applied to or removed from the manual regulator 15 when the locking plate 41 is in its lower position at which time the contacts of the magnetic safety switch 39 are in open circuit position; and the switch contacts can only be closed when the locking plate 41 is in its upper full line locking position to lock the connector plug 17 to the manual control unit 15.

Figure 9:
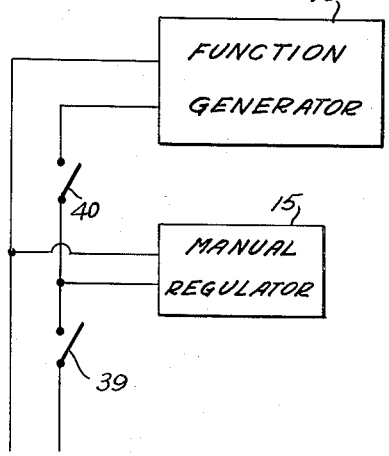
FIGURE 9 is a circuit diagram of simplified form showing the relation of the disconnect switches to the functional generator and manual regulator.

FIGURE 9 illustrates an electric circuit including the two safety switches 39 and 40 for supplying electric current to the manual regulator 15 and function generator 16 respectively. From the circuit arrangement illustrated in FIGURE 9 it will be observed that electric current from an outside source cannot be supplied to either the manual regulator 15 or function generator 16 until the connector plug 17 has been locked to the manual regulator 15. Furthermore, the function generator 16 can not be attached to or removed from the manual regulator 15 until the safety switch 40 has been opened, but such disconnection of the function generator unit will not interfere with the supply of electric current to the manual regulator 15. Thus, the two safety switches 39 and 40 and the respective locking mechanisms 41 and 42 for controlling the switches co-operate with each other in the electric circuit in which they are used. One form of the invention having now been described in detail, the mode of operation is explained below.

Assuming for the purpose of description that the plurality of modular control units 12 are mounted in operative position in the frame 13 as illustrated at the right hand side of FIGURE 1. If for any reason it is necessary to remove the function generator 16 of the controller 12 for repair or replacement, the particular controller 12 is slid outwardly from the frame 13 in the manner illustrated at the left hand side of FIGURE 1. To remove the function generator 16, it is necessary to turn the key 42 from the position shown in full lines in FIGURE 6, to the position shown in dotted lines to unlock the unit. Key 42 may be turned by means of a screwdriver applied to the slot in the exposed end at the bottom of the unit, see FIGURE 10. The turning movement of key 42 is limited by the engagement of the edge of shunt bar 74 with the side of recess 67 in guide plate 66, as shown in FIGURE 6, and as visually observed by the offset relationship of the index dots 50 and 50a on the key and bottom wall of the unit, see FIGURE 10. Such rotation of key 42 aligns its bit 44 with the keyhole 54 in the locking plate 53 to permit the function generator 16 to be detached.

Simultaneously with the turning of the key 42 to unlock the function generator 16, the magnetic shunt bar 74 fixed to the key is turned to the position illustrated in FIGURES 3, 4 and 6 to underlie the end of the magnet 72. With the shunt 74 underlying the magnet 72 the magnetic flux is shunted between the magnet poles to render the magnet inoperative to actuate the magnetically permeable switch contact 58. The contact 58 then springs away from contact 57 to the open circuit position illustrated in FIGURE 4 to open the circuit to the function generator 16. Function generator 16 may be then detached from the manual regulator unit 15 by merely lifting it therefrom without danger of arcing contacts or a shock to the technician. When function generator 16 is detached from the manual regulator 15, the magnet 72 thereon is physically removed from proximity to switch 40 so that the switch cannot be accidentally closed.

When the same function generator 16 or a replacement is to be mounted on the manual regulator 15, the key 42 must be located in open circuit position to adapt the bit 44 of the key to fit the keyhole 54. Thus, when the function generator 16 is mounted on the manual regulator 15, the magnetic safety switch 40 is open. To render the function generator 16 operative, the key 42 must be turned to remove the magnetic shunt 74 from its position between the magnet 72 and switch 40 which simultaneously locks the function generator to the manual regulator. When the magnetic shunt 74 is moved from the full line position to the dotted line position, illustrated in FIGURE 6, the magnet 72 is operative to close the contacts 57 and 58 of the safety switch 40 to complete a circuit to the function generator, as illustrated in FIGURE 9. The controller 12 is then slid rearwardly into the frame 13.

When a controller 12 is to be removed from the frame 13 for servicing, repair or replacement, the technician will first disconnect the plug 17 at the rear of the unit. To accomplish this result, the locking plate 41 must be slid from the full line position to the dotted line position, illustrated in FIGURE 8, to release the plug 17. Such movement of the locking plate 41 moves the magnet 90 mounted thereon from the full line to the dotted line position illustrated in FIGURE 8 where it is ineffective to influence the magnetic contact of the switch 39. The safety switch 39 then automatically opens before the plug 17 is completely released. As shown in FIGURE 9, the opening of switch 39 opens the circuit to both the manual regulator 15 and function generator 16. Thus, when the plug 17 is released by the locking plate 41 it can be detached without danger of arcing or shock to the technician. Similarly, the plug 17 cannot be mounted on the manual regulator 15 unless the locking plate 41 is in its unlocked position to open the safety switch 39. After the plug 17 has been detached, the controller 12 may be removed bodily from the frame 13 after which the function generator 16 may be detached, but only after the locking key 42 has been turned to release the unit and simultaneously move the shunt 74 into position to render magnet 72 inoperative to close the switch 40.

It will now be observed that the present invention provides a safety switch arrangement which insures that each detachable unit of an assembly of electrical units is electrically disconnected before a unit is assembled with or detached from the other units. It will also be observed that the present invention provides an interlocking mechanism for mechanically and electrically locking and unlocking detachable units of an assembly and simultaneously controls the operation of a magnet to open the circuit when the units are unlocked and close the circuits when the units are locked. It will also be observed that the present invention provides safety switches in the plurality of circuits of electrically connected detachable units which are selectively operable to open and close the entire circuit to a module or the circuit of individual detachable units of the module. It will still further be observed that the present invention provides a magnetically operated safety switch arrangement which is of simple and compact construction, reliable in operation and adapted for economical manufacture.

While a single embodiment of the invention is herein illustrated and described, it will be understood that changes may be made in the construction and arrangement of elements. Therefore, without limitation in this respect, the invention is defined by the following claims.

We claim:

1. Electronic apparatus of the type having separate units with separate electric circuits adapted to be electrically connected by mounting one on the other and a plug for connecting one of the units to a source of electric current, the combination with said apparatus of a disconnect switch in each circuit of each unit, movable members having locking elements for engaging the units and one of the units and plug, respectively, for mechanically locking the units to each other and the plug to one of the units, and means operated by the movement of each of the movable members to locking and unlocking position to control operation of the disconnect switches to disconnect the circuits of all the units when the plug is to be inserted and removed and disconnect the circuit of an individual unit when it is to be mounted on and removed from the other unit.

2. Electrical apparatus comprising separate detachable units having separate electric circuits adapted to be electrically connected by mounting one on the other, a detachable plug for connecting one of the units to a source of electric current, a magnetically operated disconnect switch for each circuit of the separate units, each of said magnetic switches having contacts biased to open position and magnetically operated to closed position, a magnet for each switch, movable members on one of the units having locking elements for mechanically locking the units to each other and the plug to said one unit, respectively, and means operated by each of the movable locking members to locking and unlocking positions to control the operation of a particular switch by its magnet whereby to close the contacts when the parts are locked to each other and open the switch when the parts are unlocked.

3. Electrical apparatus comprising separate units adapted to be detachably connected, cooperating electrical contacts on the separate units engageable by mounting one unit on the other to deliver electric current from one unit to the other, a magnetically operated disconnect switch on one unit having contacts normally biased to open circuit position, a magnet on the other unit for operating the contacts of the disconnect switch to closed position when the units are mounted one on the other, and said switch contacts being biased to open circuit position when the magnet is physically removed with the detachable unit from proximity to the switch on the other unit.

4. Electrical apparatus comprising separate units adapted to be detachably connected, interengaging electrical connections between said units for delivering electrical current from one unit to the other, a magnetically operated disconnect switch on one unit, a magnet on the other unit for closing the switch when the units are connected, and a magnet shunt mounted on one of the units for movement from a circuit closing position at one side of the magnet to an open circuit position between the switch and magnet.

5. Electrical apparatus having separable parts adapted to be mechanically and electrically connected by mounting one part on the other, a magnetically operated disconnect switch on one of said parts, a magnet for operating the switch, a movable member mounted on one of the parts and having a locking element for positively engaging the other part to mechanically lock the parts in connected relationship and unlock the parts for disconnection, and means actuated by said movable locking member for controlling the operation of said magnet to close the switch when moved to its locking position and open the switch when moved to its unlocking position.

6. Electronics apparatus of modular construction for mounting separate electric modules comprising a frame having guide tracks for each module on which the module slides into and out of the frame, each of the modules having separate parts with detachable contacts for electrically connecting the parts when mounted one on the other, a plug on the frame for connection to one of the parts of the module when inserted in the frame for connecting it to a source of current, a magnetically operated disconnect switch on one of the parts normally biased to open circuit position, a magnet for operating the switch to closed circuit position, and interlocking mechanism having a movable member mounted on one of the parts with a locking element operable in one position to engage another part to mechanically lock the parts to each other and operable in another position to unlock the parts, and means operated by the movable member of the interlocking mechanism to render the magnet operative to close the disconnect switch when in locking position and render the magnet inoperative to close the switch when in unlocking position.

7. Electronics apparatus of modular construction in which each module comprises separate units adapted to be detachably connected, each of said units having separate circuits and cooperating detachable contacts for electrically connecting the units when mounted one on the other, a plug connected to one of the units for connecting it to a source of current, a magnetically operated disconnect switch in the circuit of one of the units, a magnet on the other unit adjacent the disconnect switch when the units are mounted one on the other, a rotatable element on one of said units operable in one position to lock the units to each other and operable in another position to unlock the units, and a magnetic shunt carried by said rotatable element and positioned between said magnet and switch in its unlocked position and to one side of said magnet in its locked position.

8. Electronics apparatus comprising a unit having electrical equipment mounted thereon and connected to form an electric circuit, electric terminals on said unit connected to said circuit, a detachable plug having a locking shoulder and electric terminals for connection with the terminals on the unit, a magnetically operated switch in the circuit of the unit, a member mounted for movement on said unit and having a locking element operable in one position to engage the shoulder on the plug to mechanically lock the plug to the unit and operable in another position to release the plug for detachment, and a magnet mounted on said locking element and operable in the locked position to close the switch and in the unlocked position to open said switch.

9. Electrical apparatus in accordance with claim 5 in which the magnetically operated disconnect switch comprises contacts normally biased to one position, and at least one of said contacts being magnetically operable to another position.

10. Electrical apparatus in accordance with claim 5 in which the movable locking member is a key rotatably mounted in one of the parts, a keyhole in the other part, and said key having a bit engaging said other part to lock the parts in assembled relation.

11. Electrical apparatus in accordance with claim 10 in which a magnetic shunt is mounted on the stem of the key and so related to the bit as to be moved between the magnet and switch when the bit is aligned with the keyhole to mount or dismount one of the parts on the other, and to be moved out of the path between the magnet and switch when the bit is moved to locking position.

12. Electrical apparatus in accordance with claim 11 in which the magnetic shunt is a narrow bar of magnetic material fixedly mounted on the stem of the key in a predetermined angular relation to the bit.

13. Electrical apparatus in accordance with claim 5 in which the movable locking member is a slide on one of the parts, spaced shoulders on the other parts, said slide having spaced shoulders for locking engagement with the shoulders on the other part when the latter is mounted in electrical engagement with the other part, and means for mounting the magnet on the slide for movement from a switch closing to a switch opening position when the movable locking member is moved from locking to unlocking positions.

14. Electrical apparatus in accordance with claim 5 in which the magnetically operated disconnect switch comprises contacts normally biased to open circuit position and magnetically operated to close circuit position, and the magnet is mounted on the separable part when detached from the other part so as to prevent operation of the disconnect switch to closed circuit position except when the separable parts are mounted one on the other.

References Cited in the file of this patent

UNITED STATES PATENTS

| | | |
|---|---|---|
| 2,257,900 | Crum | Oct. 7, 1941 |
| 2,298,313 | Ross | Oct. 13, 1942 |
| 2,322,851 | Kalb | June 29, 1943 |
| 2,531,350 | Chrastina | Nov. 21, 1950 |
| 2,754,454 | McNutt et al. | July 10, 1956 |
| 2,770,697 | Kellett | Nov. 13, 1956 |
| 2,848,572 | Wagnecz | Aug. 19, 1958 |